Figure 1:
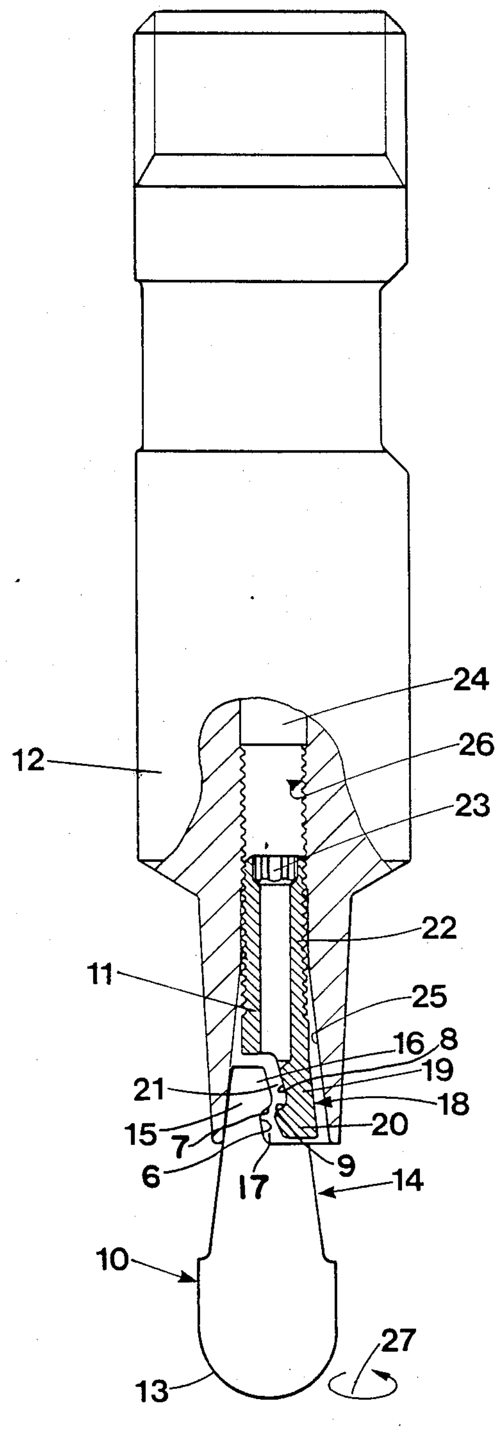

United States Patent [19]
Strand et al.
[11] Patent Number: 4,850,759
[45] Date of Patent: Jul. 25, 1989

[54] TOOL FOR METAL CUTTING

[75] Inventors: Bengt N. G. Strand; Sven L. Eklund, both of Fagersta, Sweden

[73] Assignee: Seco Tools AB, Fagersta, Sweden

[21] Appl. No.: 204,284

[22] Filed: Jun. 9, 1988

[30] Foreign Application Priority Data

Jul. 8, 1987 [SE] Sweden .............................. 87027991

[51] Int. Cl.⁴ .............................................. B23B 31/10

[52] U.S. Cl. .................................... 408/239 A; 279/8; 279/89; 279/99; 403/258; 408/226

[58] Field of Search ..................... 279/1 A, 1 P, 8, 89, 279/90, 91, 93, 94, 99, 100, 101; 408/226, 240, 239 A, 239 R, 238; 409/232, 234; 403/258, 259, 260

[56] References Cited

U.S. PATENT DOCUMENTS

| | | | |
|---|---|---|---|
| 829,633 | 8/1906 | Decker | 279/99 |
| 1,480,355 | 1/1924 | Webster . | |
| 2,109,108 | 2/1938 | Fesler | 279/8 |
| 2,349,741 | 5/1944 | McLaughlin | 279/89 |
| 3,759,536 | 9/1973 | Bronzini | 279/89 |

FOREIGN PATENT DOCUMENTS

| | | | |
|---|---|---|---|
| 3314591 | 10/1984 | Fed. Rep. of Germany | 279/8 |
| 1589460 | 5/1970 | France . | |
| 2602162 | 2/1988 | France . | |
| 781423 | 11/1980 | U.S.S.R. | 408/240 |
| 542796 | 1/1941 | United Kingdom | 408/226 |
| 990353 | 4/1965 | United Kingdom | 279/89 |
| 2158374 | 11/1985 | United Kingdom | 279/1 A |

*Primary Examiner*—Gil Weidenfeld
*Assistant Examiner*—Daniel W. Howell
*Attorney, Agent, or Firm*—Burns, Doane, Swecker & Mathis

[57] ABSTRACT

The present invention relates to a tool for metal cutting, said tool in working position preferably rotating around its longitudinal center axis, and that the tool comprises a cutting body (10;10*a*;10*b*;10*c*) and a shaft (12;12*a*;12*b*;12*c*), that supports the cutting body (10;10*a*;10*b*;10*c*).

The aim of the invention is to solve the problem to design milling, drilling and turning tools of small dimensions having exchangeable cutting edges.

The present invention is characterized in that the cutting body of the tool is designed as a uniform body comprising integrated cutting edges. By means of a locking screw (11; 11*a*;11*b*;11*c*) the cutting body (10;10*a*;10*b*;10*c*) is detachably fixed in the shaft (12;12*a*;12*b*;12*c*).

8 Claims, 2 Drawing Sheets

TOOL FOR METAL CUTTING

BACKGROUND OF THE INVENTION

This invention relates to a tool for metal cutting, said tool comprising a cutting body and a shaft that supports the cutting element.

It is previously known to use exchangeable cutting edges in the shape of indexable inserts for different types of tools for metal cutting. However, this technique in practice has its limitations due to strength reasons when dealing with milling and drilling tools having a cutting diameter of less than or equal to about 10 mm.

The aim of the present invention is to disclose a solution to the problem of how to design milling, drilling and turning tools of small dimensions having exchangeable cutting edges.

The aim of the invention is realized by a tool of the type mentioned above that has been given the characteristics of the appending claims.

THE DRAWINGS

Figure 2:
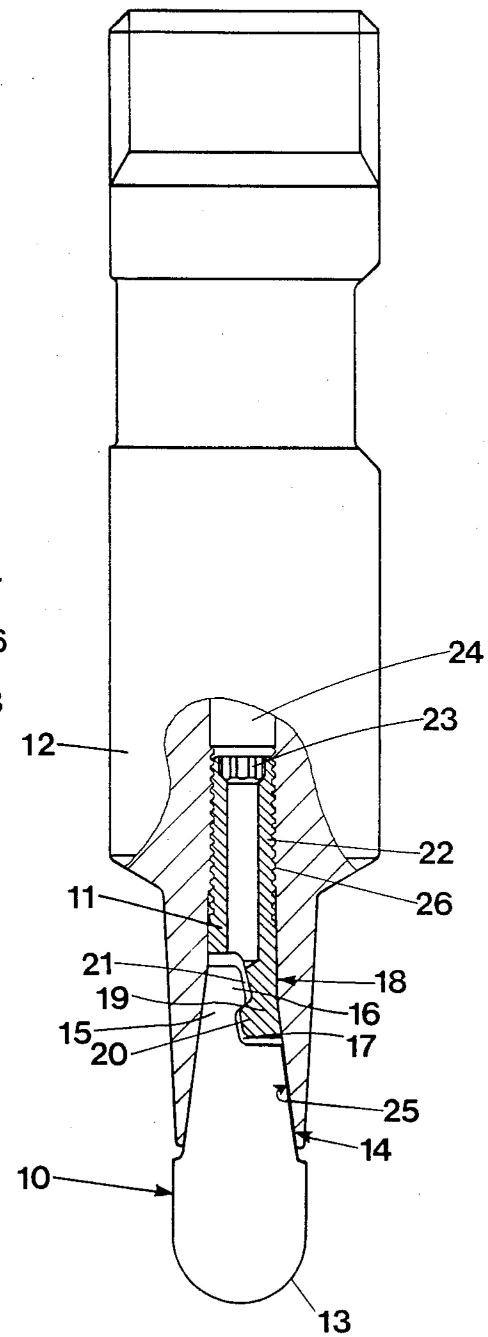
Figure 3:
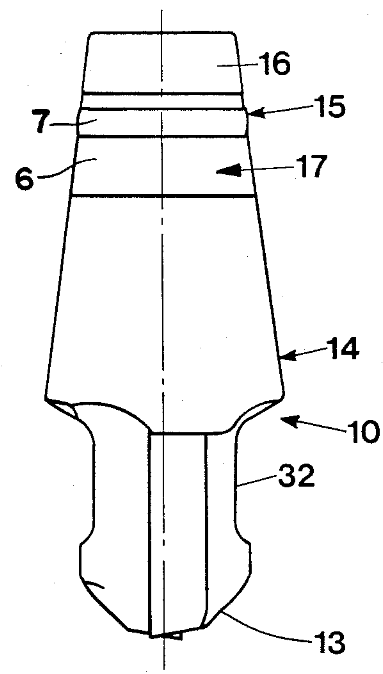
Figure 4:
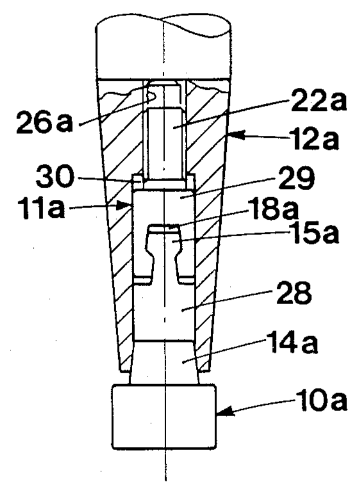
Figure 5:
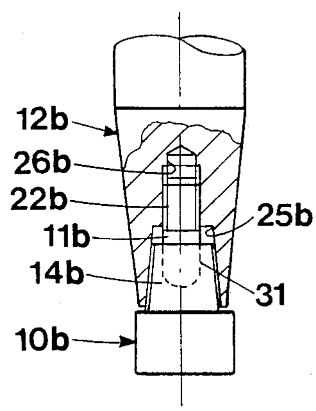
Figure 6:
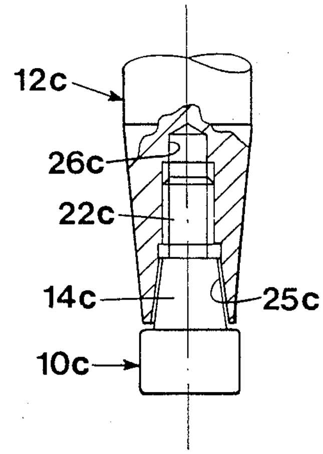

Below embodiments of the invention will be described with reference to the accompanying drawings, where FIG. 1 discloses the elements of a tool according to the invention before they are mounted together;

FIG. 2 discloses a tool according to the invention in mounted position;

FIG. 3 discloses in greater detail a side view of a cutting body according to the invention;

FIG. 4 discloses an alternative embodiment of a tool according to the invention;

FIG. 5 discloses a further alternative embodiment of a tool according to the invention; and FIG. 6 discloses still a further alternative embodiment of a tool according to the invention.

DESCRIPTION OF THE INVENTION

The embodiment disclosed in FIGS. 1 and 2 of a tool according to the invention comprises a cutting body 10, a locking screw 11 and a shaft 12.

The end of the cutting body 10 that is directed from the shaft 12 is provided with at least one cutting edge that can be given different designs due to the field of application. Thus, the cutting edge or edges are straight and parallel to the longitudinal center axis of the cutting body when dealing with a shank end mill, while the cutting edges are circular when dealing with a radial mill. The enumeration is only exemplifying and the front end of the cutting body 10 is not shown in detail in FIGS. 1 and 2 since it can be varied in many ways and does not constitute an essential part of the present invention.

At the end of the cutting body 10 that is directed towards the shaft 12 a first conical portion 14 is provided that has a first engagement means 15 comprising a first tongue 16 and a first slot or recess 17 defined by a front-to-rear extending surface 6 and a laterally extending surface 7.

In FIG. 3 the cutting body 10 is disclosed more in detail and viewed in the plane of the paper in FIGS. 1 and 2. From FIG. 3 it can be learned that the free end 13 of the cutting body 10 is provided with a key handle 32. The use of said key handle 32 is explained below.

The locking screw 11 has a second conical portion at the end that is directed towards the cutting body, said second conical portion having a second engagement means 19 that is intended to mate with the first engagement means 15. Each of the engagement means 15, 19 is hook-shaped, and neither hook extends around more than one-half the circumference of the respective component 10 or 11. As is obvious from FIGS. 1 and 2 the arrangement of the second engagement means 19 has caused an essential portion of the second conical portion 18 to be deleted. The second engagement means 19 comprises a second tongue 20 and a second recess 21 defined by a front-to-rear extending surface 8 and a laterally extending surface 9. In working condition the first tongue 16 cooperates with the second recess 21 and the second tongue 20 with the first recess 17.

Inside of the second engagement means 18, in axial direction, the locking screw 11 has an externally threaded, preferably cylindrical portion 22.

An implement such as an Allen key insert 23 is arranged at the innermost end of the locking screw 11 thus making it possible to loosen and tighten the locking screw 11 through the internal duct 24 of the shaft 12. However, normally the tightening and loosening of the locking screw 11 is carried out via the external key handle 32.

The shaft 12 is provided with a conical seat 25 at the end that is directed towards the cutting body 10. Said conical seat 25 receives the first and second conical portions 14 and 18 of the cutting body 10 and the locking screw 11, respectively. Inside of the conical seat 25 the shaft 12 has a substantially cylindrical, internally threaded portion 26 that cooperates with the externally threaded portion 22 on the locking screw 11. Inside of the portion 26 the duct 24 mentioned above is located.

In FIG. 1 the starting or insertion/removal position for mounting of the cutting body 10 in the shaft 12 is disclosed. In this position the locking screw 11 is displaced axially towards the open end of the conical seat 25. Thereby it is possible that the first engagement means 15 of the cutting body 10 is inserted into the conical seat 25 and automatically takes a position for engagement with the second engagement means of the locking screw 11. When rotating the cutting body 10 in the direction of the arrow 27, preferably by a wrench that is engaging the key handle 32, the locking screw 11 will also rotate in the direction of the arrow 27. Cooperation between the external thread 22 and the internal thread 26 causes the locking screw 11 and also the cutting body 10 to be displaced axially into the shaft 12 until the conical portion 14 contacts the conical seat 25, i.e., the securement position according to FIG. 2 has been achieved wherein the first and second engagement means 15, 19 are displaced toward one another into locking relationship. The cutting body 10 is now in a satisfying way anchored in the shaft 12. Since the lateral surface 9 of the locking screw lies in the path of rotation of the lateral surface 7 of the cutting body, no rotation of the cutting body relative to the locking screw is possible.

In this connection it should be pointed out that the thread 22 of the locking screw 11 has two purposes, namely first to place the cutting body 10 in a fixed position in the shaft in the mounting state, and second, during use of the cutting tool, always to guarantee that the cutting body 10 remains in its fixed position regardless of how the dimensions of the cutting body 10 and the shaft 12 are affected by heat generated from the machining.

The threads 22 and 26 are designed as right hand threads for right hand cutting tools and as left hand threads for left hand cutting tools.

When the cutting body 10 is to be exchanged one acts in the opposite way compared to the mounting, i.e. rotation of the cutting body 10 in opposited direction to the arrow 27 is carried out until the position of FIG. 1 is achieved. At that position the cutting body 10 can be removed from the shaft 12.

In the embodiment according to FIG. 4 the conical portion 14a emanating from the cutting body 10*a* has a, relatively seen, smaller axial extension, said conical portion 14*a* is transferred into a cylindrical portion 28 that at its free end supports a first engagement means 15*a* in the shape of a dove-tailed projection that is symmetrical in respect of the rotational axis of the cutting body 10*a*.

The locking screw 11*a* according to FIG. 4 is provided with a cylindrical portion 29 that is directed towards the cutting body 10*a*, said cylindrical portion 29 having a second engagement means 18*a* in the shape of a dove-tailed recess that is intended to receive the engagement means 15*a* in order to create cooperation between the engagement means 15*a* and 18*a* to transfer rotational movement and axial forces. The end of the locking screw 11*a* that is directed from the cutting body 10*a* has an external threaded portion 22*a*. The shaft 12*a* is provided with a conical seat 25*a* to receive the conical portion 14*a*. Inside the conical seat 25*a* the shaft has a cylindrical recess 30 that in working position receives the portion 29.

The cylindrical recess 30 is at its inner end transferred into an internally threaded recess 26*a* that in working position cooperates with the externally threaded portion 22*a*.

In principle the embodiment according to FIG. 4 functions in a corresponding way as the embodiment according to FIGS. 1 and 2.

The embodiment of the invention schematically disclosed in FIG. 5 has a conical portion 14*b* emanating from the cutting body 10*b*, said conical portion 14*b* at its inner end having a recess 31 receiving a locking screw 11*b* having an externally threaded portion 22*b*, said locking screw 11*b* being fixed by brazing in said recess 31.

The shaft 12*b* has a conical seat 25*b* that in the working position receives the conical portion 14*b*. Also the shaft 12*b* has an internally threaded recess 26*b* that in working position receives the externally threaded portion 22*b*.

The embodiment according to FIG. 5 differs from the embodiment described above in that the engagement means for transferring rotational movement and axial forces have been deleted. When exchanging the cutting body 10*b* also the locking screw 11*b* is exchanged.

Within the scope of the invention it is also possible to modify the embodiment according to FIG. 5 in such a way that the thread coupling between the locking screw and the cutting body is located in the recess 31 while the locking screw 11*b* is fixed by brazing in the shaft 26*b*.

The embodiment according to FIG. 6 reminds to a great extent of the embodiment according to FIG. 5. The only principal difference is that the externally threaded portion 22*c* is integral with the conical portion 14*c*.

In all the embodiments described above the cone angle for the cutting body and the seat should be less than 25°. It is also pointed out that the embodiments described above refer to mills, i.e. tools that rotate relative its longitudinal centre axis. Mills having small cutting tips are probably the dominating application field for the present invention but also drilling and turning tools are within the scope of the invention.

The invention is in no way restricted to the embodiments described above but can be freely varied within the scope of the appending claims.

We claim:

1. A cutting tool for metal cutting comprising:

a shaft having a conical seat and a recess with an internally threaded rear portion, said threaded portion containing either right-hand threads for right-hand cutting tools or left-hand threads for left-hand cutting tools, said seat defining a front-to-rear extending longitudinal axis, a locking screw including:

an externally threaded rear portion for threaded connection with said internally threaded portion, and a first engagement means disposed at a front portion of said locking screw and having first mating surface means which includes a first laterally extending surface, and a cutting body including:

a conical portion configured correspondingly to said conical seat, a cutting edge at a front portion of said cutting body, and a second engagement means disposed at a rear portion of said cutting body and comprising second mating surface means which includes a second laterally extending surface, said second mating surface means configured to mate with said first mating surface means such that said second lateral surface is disposed behind said first lateral surface, said cutting body being insertable into and removable from such mating relationship when said cutting body is in an insertion/removal position out of contact with said conical seat, said locking screw being rotatable within said recess about said axis causing said locking screw to be moved rearwardly by said threaded connection with said shaft, such rearward movement being transmitted to said cutting body by said first lateral surface to pull said cutting body rearwardly from said insertion/removal position into a securement position wherein said conical portion tightly engages said conical seat, said first mating surface means being configured such that at least a portion thereof lies in a path of rotation of said second mating surface means about said axis when said cutting body is in said securement position to thereby prevent rotation of said cutting body relative to said locking screw in either direction of rotation.

2. A cutting tool according to claim 1, wherein each of said first and second engagement means is hook-shaped and extends around no more than one-half of the circumference of said locking screw and cutting body, respectively.

3. A cutting tool according to claim 2, wherein each of said first and second engagement means includes a laterally extending tongue and slot, said tongue and slot of said first engagement means being mateable with said slot and tongue, respectively, of said second engagement means.

4. A cutting tool according to claim 1, wherein said conical seat is defined by an inside conical surface of said recess located at a front portion of said recess, said conical portion of said cutting body comprising an outside conical surface.

5. A cutting tool according to claim 4, wherein said outside conical surface surrounds said second engagement means, each of said first and second engagement means being hook-shaped, said first and second hook-shaped engagement means being displaced radially toward one another in response to engagement between said conical portion and said conical seat.

6. A cutting tool according to claim 1, wherein said cutting body includes a surface located forwardly of said second lateral surface and rearwardly of said cutting edge for receiving a hand implement, whereby rotation of said cutting body is transmitted to said locking screw through said first and second engagement means to cause said locking screw to be moved rearwardly.

7. A cutting tool according to claim 1, wherein said locking screw includes means at a rear end thereof for receiving a hand implement through an internal duct of said shaft.

8. A cutting tool according to claim 1, wherein one of said first and second engagement means comprises a dove-tailed aperture and the other thereof comprises a dove-tailed projection received in said aperture.

* * * * *